No. 786,420. PATENTED APR. 4, 1905.
H. H. CUTLER.
ELECTRIC SPEED ACCELERATOR.
APPLICATION FILED APR. 22, 1901.
2 SHEETS—SHEET 1.
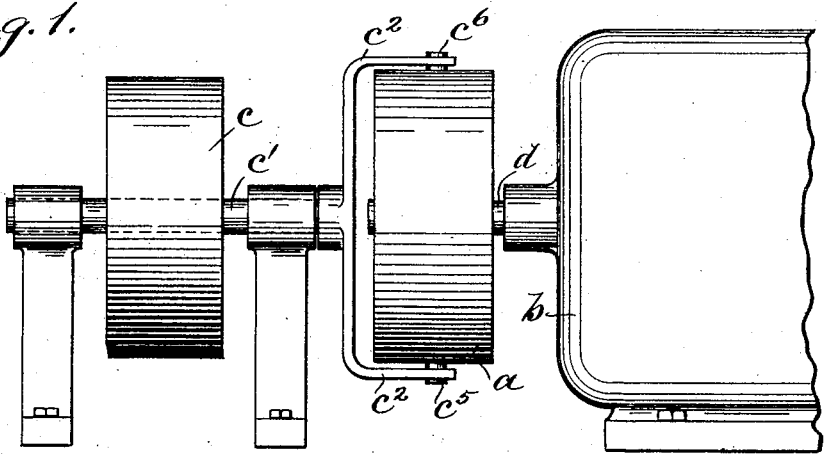
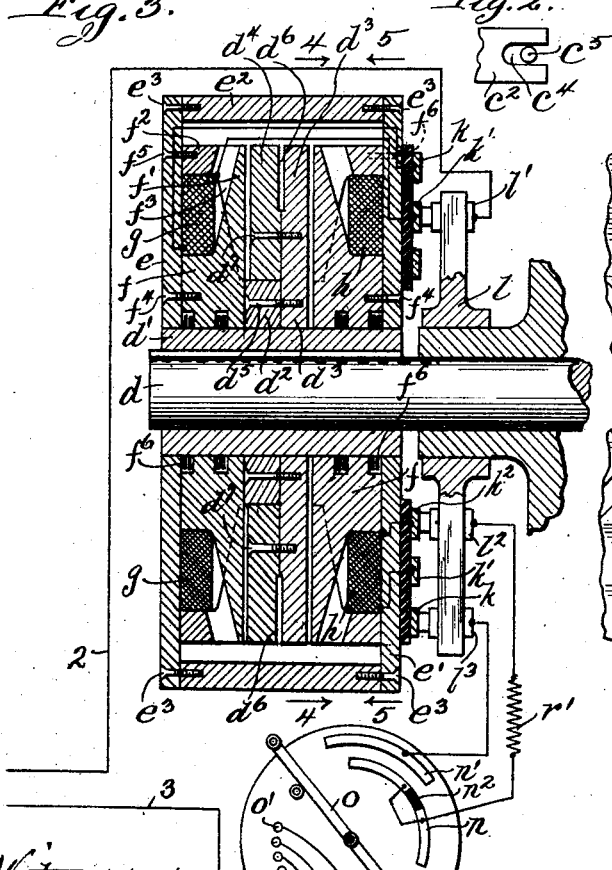
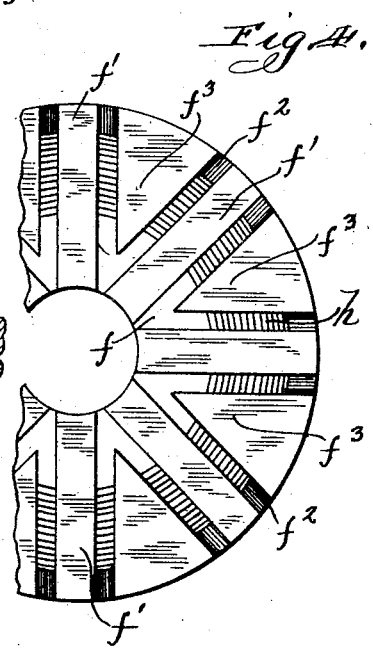
Witnesses:
Inventor:
Henry H. Cutler
By Jones & Addington
Attorneys

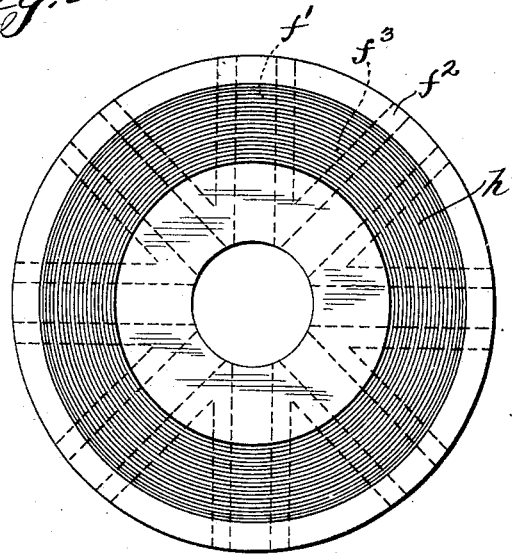
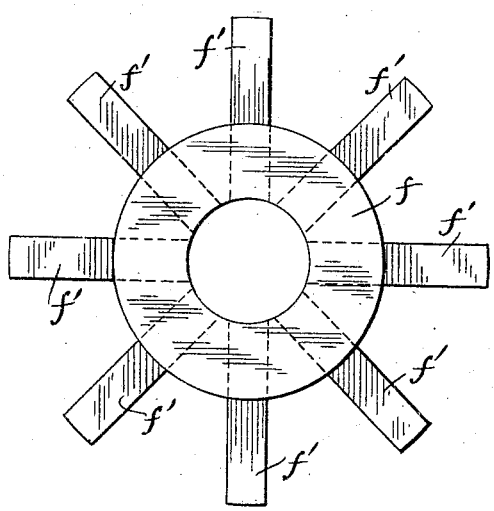
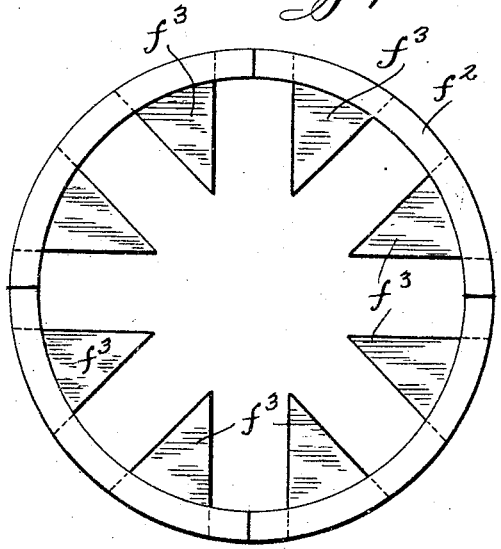

No. 786,420.

Patented April 4, 1905.

UNITED STATES PATENT OFFICE.

HENRY H. CUTLER, OF MILWAUKEE, WISCONSIN, ASSIGNOR TO THE ARNOLD MAGNETIC CLUTCH COMPANY, OF MILWAUKEE, WISCONSIN, A CORPORATION OF WISCONSIN.

ELECTRIC SPEED-ACCELERATOR.

SPECIFICATION forming part of Letters Patent No. 786,420, dated April 4, 1905.

Application filed April 22, 1901. Serial No. 56,999.

*To all whom it may concern:*

Be it known that I, HENRY H. CUTLER, a citizen of the United States, residing at Milwaukee, in the county of Milwaukee and State of Wisconsin, have invented a certain new and useful Improvement in Electric Speed-Accelerators, of which the following is a full, clear, concise, and exact description, reference being had to the accompanying drawings, forming a part of this specification.

My invention relates to an electric speed-accelerator—that is, a device comprising a driving part adapted to be connected with a motor or prime mover and a driven part adapted to be connected with the mechanism to be driven, whereby the driven part may be rotated at any desired speed equal to or less than that of the driving part.

It is frequently desirable to provide means whereby the motor or engine may be started or run at full speed before the load is applied thereto; and it is the object of the present invention to provide an electrical device, which I term a "speed-accelerator," whereby the driven mechanism may be moved at any desired speed equal to that of the driving-motor or at any desired or prearranged lower speed. It is often desirable to drive a number of machines from a single prime mover, and by interposing the speed-accelerator of my invention between each of the machines and the prime mover the machines may be individually started and stopped without affecting the continuous operation of the prime mover.

My invention is also particularly applicable to electric motors of the alternating-current type, which are frequently incapable of starting under load. Motors of this type are capable of driving a load when running at speed, but are incapable of starting from rest when under load. By the device of my invention the motor may be started in motion, and when running at normal speed the load may be applied thereto.

The above illustrates the applicability of the present invention, and it will be understood that the speed-accelerator will be applicable to many other uses than those which I have above mentioned.

In accordance with my invention I provide a driving and a driven part, the former adapted to be connected with the motor or prime mover and the latter with the machine or mechanism to be driven, and I associate with said driving and driven parts electromagnetic energizing means whereby the driven part may be moved at the same speed as the driving part or at a less speed. In the embodiment of my invention which I preferably employ in practice I have constructed the driving and driven parts so that they form portions of the same magnetic circuit, whereby an attractive force is exerted between the driving and driven parts. In order that the driving and driven parts may rotate relatively when moving at different speeds without objectionable frictional contact, I associate the parts so that an air gap or space may be left between the opposed faces of the relatively moving parts, across which air-gap the magnetic attraction is adapted to be exerted. When it is desired to rotate the driven part at the speed of the driving part, the opposed faces may be brought together in physical contact, whereby the air-gap is eliminated. In this position the driving and driven parts rotate as one piece, and during normal operation at full speed the apparatus possesses maximum efficiency, due to the elimination of the air-gap, which would otherwise introduce an objectionable reluctance in the magnetic circuit. While this is the preferred structure, it will be understood that the device is capable of various modifications without departing from the spirit of my invention as herein disclosed and as set forth in the appended claims.

In the structure which I employ in practice I provide a supplemental winding adapted to coöperate with the main or energizing winding of the accelerator to interpose an air-gap between the opposed faces of the driving and driven parts or to eliminate said air-gap, as desired. Moreover, I arrange this supplemental winding so that it will assist in exerting attractive force between the two parts of the accelerator during the time the said parts are rotating at relatively different speeds. Since a much less power is required to hold the two parts together when in physical contact than when the air-gap is present, I may during normal operation at full speed remove the supplemental winding from circuit and depend upon the main winding for such attractive force as is necessary. I have provided a novel form of controlling apparatus which in its individual capacity also constitutes one of the features of the present invention.

I have illustrated my invention in the accompanying drawings, in which—

Figure 1 is a view in elevation, showing the device of my invention interposed between a driving-motor and a driven part. Fig. 2 is a detailed view of a portion of the connection between the speed-accelerator and the driven part. Fig. 3 is a sectional view of the speed-accelerator, the circuits being shown in diagram. Fig. 4 is a partial view of the field-magnet of the accelerator looking at the face thereof. Fig. 5 is a similar view looking toward the rear. Figs. 6 and 7 are detached views of the parts comprising the field-magnet.

Like characters refer to like parts in the several figures.

As shown in Fig. 1, the accelerator $a$ is interposed between the driving part $b$ (which may be an electric motor or any other motive device) and the driven part $c$, which in the present instance is shown as a pulley mounted upon a shaft $c'$, which carries upon the end spreaders or arms $c^2 c^2$, each carrying in the end thereof a slot $c^4$, said slots engaging the pins $c^5 c^6$, mounted upon the exterior of the accelerator. Upon the shaft $d$ of the motor $b$ a sleeve $d'$ is keyed, the sleeve having a hub $d^2$, to the face of which is secured a disk of steel $d^3$. To the face of the disk $d^3$ and upon the exterior of the hub $d^2$ is a second disk $d^4$ of steel. The hub and the disks of steel are firmly secured together by means of the screws $d^7 d^5$. A peripheral slot $d^6$ is provided between the disks $d^3 d^4$ to prevent the formation of undesirable eddy-currents.

The parts as above described constitute the driving part of the accelerator and are mounted to rotate with the driving-shaft $d$.

Mounted to rotate about the sleeve $d'$ are the disks $e e'$, joined together at the peripheries by means of the cylindrical shell $e^2$. The disks are secured to the shell by means of screws $e^3 e^3$. Within the casing thus formed by the disks $e e'$ and the shell $e^2$ the field-magnets are mounted. I preferably form the field-magnets in the manner illustrated, in which a ring $f$ carries radially and outwardly extending poles $f' f'$. A similar ring $f^2$ carries radial inwardly-extending poles $f^3 f^3$. Between the rings $f f^2$ and the disk $e$ an annular space is thus left, within which is placed the winding $g$. The rings $f$ and $f^2$ are secured to the disk $e$ by means of the screws $f^4 f^5$. The exposed faces of the poles $f' f^3$ rest in a common plane. Likewise a field-magnet is mounted upon the disk $e'$, said field-magnet comprising the rings $f f^2$, carrying the radial poles $f' f^3$, respectively, said rings being secured to the disk $e'$ by means of the screws $f^4 f^5$. A winding $h$ is placed in the annular space formed by the rings and the disk $e'$. The rings $f f$ are provided with channels $f^6 f^6$ for lubricating purposes. Upon the outer face of the disk $e'$ three concentric contact-rings $k, k'$, and $k^2$ are provided. The ring $k$ is connected with one side of the winding $g$. The other side of said winding is connected with ring $k'$. Ring $k'$ is likewise connected with one side of the winding $h$, and the opposite side of said winding is connected with ring $k^2$. Supported in a stationary position is a carrier or support $l$, upon which are mounted the brushes $l', l^2$, and $l^3$. The brush $l'$ is connected with one side 2 of a suitable supply-circuit, while the brush $l^2$ is connected, through a resistance $r'$, with a contact-segment $n$. The brush $l^3$ is connected with a contact-segment $n'$. A pivoted contact-arm $o$ is adapted to be moved over the segments $n n'$, and the opposite end thereof is adapted to sweep over the contact-terminals $o' o'$, between which are connected the coils of a resistance $r$. The last terminal $o'$ of this rheostat is connected with the opposite main 3 of the supply-circuit.

Assuming that the motor $b$ is in operation and is rotating the shaft $d$, the armature consisting of the disks $d^3 d^4$ and supporting-sleeve $d'$ will rotate with the shaft $d$ so long as no current traverses the windings $g$ and $h$. The driven part of the accelerator including the field-magnets will remain at rest. Assuming that mechanism to be driven is belted with the pulley $c$ and it be desired to start this mechanism in motion, the handle $o$ will be moved to segment $n'$, thereby closing circuit from conductor 3 through the rheostat $r$ to the last terminal $o'$, thence through the contact-arm $o$ to segment $n'$, thence to brush $l^3$ and ring $k$, from which current flows through the winding of the circuit. Winding $g$ being thus energized polarizes the two sets of poles $f' f'$ and $f^3 f^3$, and the disk $d^4$ is thereby attracted, the magnetic circuit between the poles being completed through the said disk. As the field-magnets are capable of slight lateral movement upon the sleeve $d'$, the attraction exerted upon the disk $d^4$ by the poles will move the field-magnets to the right until further movement is limited by engagement with the hub $d^2$. A slight space will thus be left between the face of the disk $d^4$ and the faces of the poles $f' f^3$. This space is shown somewhat exaggerated in the drawings for the purpose of illustration; but in practice this clearance or space would be only about three one-thousandths of an inch when the metal is cold. Provision is thus made for the expansion of the metal when heated, due to the formation of eddy-currents. The space should be of sufficient size to accommodate the expansion under the conditions of use without bringing the faces into direct contact. It is desirable to make the clearance as small as possible to reduce the reluctance of the magnetic circuit to as small a quantity as possible. The magnetic attraction exerted between the disk $d^4$ and the pole-pieces causes the field-magnet, with its inclosing shell, to rotate, thereby imparting motion to the driving mechanism. The further movement of the contact-arm $o$ carries the same into engagement with contact-segment $n$, thereby closing circuit from conductor 3 through rheostat $r$, contact-arm $o$, segment $n$, resistance $r'$, brush $l^2$, ring $k^2$, winding $h$, ring $k'$, brush $l'$ to the opposite side 2 of the supply-circuit. Winding $h$ is thus energized to polarize the pole-pieces $f'$ $f^3$ of the field-magnet shown upon the right, and the magnetic circuit between the pole-pieces is completed through the disk $d^3$. Due to the interposition of the resistance $r$, the current through the winding $h$ is of less strength than the current through the winding $g$. Accordingly the magnetic field due to the winding $g$ is stronger than that due to the winding $h$, and the relative positions of the driving and driven parts laterally is not altered upon the closing of the circuit through the winding $h$. When the driven part is to the extreme right, as shown in the drawings, the clearance or space between the face of the disk $d^3$ and the polar faces of the field-magnet upon the right is preferably about three one-thousandths of an inch. The two field-magnets are now energized and coöperate in exerting a pull upon the disks carried upon the sleeve $d'$, and the positive rotation of the disks by the motor causes the field-magnets and inclosing shell to move at a less speed determined by the strength of the current through the windings. By moving the switch-arm $o$ to cut out more of the resistance of the rheostat $r$ the strength of the current through the windings may be varied to increase the speed as desired. With small loads the speed of the driven part may thus be brought to approximately the same speed as the driving part. With large loads, however, the speed of the driven part will fall short of the speed of the driving part when the maximum magnetic force is being exerted. If now it be desired to clamp the driving and driven parts together to cause the same to rotate at the same speed, the switch-arm $o$ may be further moved to carry the same out of contact with segment $n'$ to thus open the circuit through winding $g$. The field-magnet upon the left is thus deënergized, and the attraction exerted by the field-magnet upon the right draws the polar faces into mechanical contact with the face of the disk $d^3$. As the maximum current is now flowing through the winding $h$, the magnetic effect is sufficient to rigidly clamp the field-magnet and the disk $d^3$ together. The driving and driven parts thus rotate together at the same speed. Since the small air-gap has now been eliminated from the magnetic circuit, less current is required to maintain the driving and driven parts locks together, and accordingly the switch-arm $o$ may be further moved to cut in some of the resistance of the rheostat $r$.

When it is desired to disconnect the driven part from the driving part, the switch-arm $o$ may be moved in the reverse direction to close circuit through winding $g$, thereby shifting the driven part to the right due to the greater strength of the winding $g$, and by the further movement of the switch-arm $o$ the current through the windings may be cut off, thereby deënergizing both field-magnets and permitting the driven part to come to rest. It will be noted that a block $n^2$ of insulation is interposed between the two parts of the segment $n$, the two parts, however, being electrically connected together by a suitable conductor. When the switch-arm $o$ is being moved to the right in starting the device, the rapidity of the movement will prevent the block of insulation from opening the circuit through the winding $h$ for an appreciable period of time. When, however, the switch-arm $o$ is being moved to stop the device, the circuit through the winding $h$ is opened when the switch-arm $o$ reaches the block of insulation. Before the switch-arm $o$ has left the block of insulation it engages the segment $n'$, thereby closing circuit through winding $g$ while the winding $h$ is deënergized. The winding $g$ is thus enabled to move the field-magnet relatively to the armature to interpose the air-gaps. The further movement of the switch-arm $o$ again closes circuit through winding $h$; but as the air-gaps are interposed the winding $g$ will be more powerful than winding $h$, and the parts will rotate with the air-gaps present. If it were not for the provision of the insulating-block $n^2$ or equivalent means, the magnetic field meshing with the winding $h$ due to the elimination of the air-gap would be stronger than the magnetic field due to the winding $g$.

In an application filed by me August 5, 1903, Serial No. 168,388, I have described and claimed broadly a magnetic clutch or accelerator having novel construction and operation, and the present application relates to one of the species of the generic invention set forth in my application above mentioned. In an application filed August 5, 1903, Serial No. 166,389, I have described and claimed generically a species of the said generic invention wherein two windings are employed, and the present application is also subsidiary to said application last above mentioned.

Having described my invention, what I claim as new, and desire to secure by Letters Patent, is—

1. The combination with a driving and a driven part, of electromagnetic means associated therewith and operatively energized for causing said driven part to move at the same speed as the driving part with faces in physical contact or at a less speed with an air-film interposed between the faces, substantially as described.

2. The combination with a driving and a driven part, of a field-magnet adapted to be energized operatively during the movement of said parts and having portions of the magnetic circuit carried upon said respective parts, and means for interposing air-space between the portions of the magnetic circuit carried upon said respective parts while the driven member is being driven or for eliminating said air-space during such operation, substantially as described.

3. The combination with a driving and a driven part adapted to rotate, of electromagnetic means for operatively exerting an attraction between said parts during said rotation and means for interposing an air-space between the opposed surfaces of said driving and driven parts, or for eliminating said air-space during said rotation, substantially as described.

4. The combination with a driving and a driven part, of electromagnetic means for operatively exerting attraction between the same, and means for causing said parts to rotate with their opposed surfaces separated by an air-space or with their opposed faces in physical contact, substantially as described.

5. The combination with a driving and a driven part, of electromagnetic means for operatively exerting an attraction between said parts and a controller for causing said parts to move either with their opposed faces out of physical contact or in physical contact, substantially as described.

6. The combination with a driving and a driven part, of a winding or windings associated therewith for operatively exerting an attraction between said parts and a supplemental winding coöperating with said main winding to interpose or eliminate an air-space between the opposed faces of said driving and driven parts, substantially as described.

7. The combination with a driving and a driven part, of a pair of field-magnets carried upon one of said parts, and having the magnetic circuits completed through the other part, said field-magnets being adapted to coöperate to drive the driven part at the same speed as the driving part with faces in physical contact or at a less speed with an air-film interposed between said faces, substantially as described.

8. The combination with a driving and a driven part, of an electromagnetic means associated therewith for operatively exerting an attraction between said parts, and means for moving said parts relatively to move the opposed surfaces thereof into or out of physical contact during the driving operation due to said continuous attraction, substantially as described.

9. The combination with a driving and a driven part, of electromagnetic means for exerting an attraction between the same, and a pair of windings coöperating to cause said driven part to move at the same speed as the driving part with faces in physical contact or at a less speed with an air-film interposed between said faces, substantially as described.

10. The combination with a driving and a driven part, of electromagnetic means for operatively exerting an attraction between the said parts and at the same time driving them either out of physical contact at different speeds or in physical contact at the same speed, a pair of windings forming a part of said means, and controlling means for separately cutting said windings into and out of circuit, substantially as described.

11. The combination with a driving and a driven part, of electromagnetic means for operatively exerting an attraction between the said parts and at the same time driving them either out of physical contact at different speeds or in physical contact at the same speed, a pair of windings forming a part of said means, and means for closing circuit through one of said windings in advance of the other, substantially as described.

12. The combination with a driving and a driven part, of electromagnetic means for exerting an attraction between the same, a pair of windings, means for cutting one of said windings into circuit and out of circuit in advance of the other and for including both in circuit at the same time, substantially as described.

13. The combination with a driving and a driven part adapted to move with their opposed faces either in or out of contact, of electromagnetic means for exerting an attraction between the same, a pair of windings, one arranged to have a greater attractive effect than the other, and means for cutting said windings into and out of circuit whereby said parts may be caused to move with their opposed faces either in or out of physical contact, substantially as described.

14. The combination with a driving and a driven part, one of said parts carrying a pair of magnetic fields and the other part carrying a coöperating armature, of a pair of windings on opposite sides of one armature for energizing said fields and switching mechanism for cutting said windings into and out of circuit in a definite order and means for regulating the strength of the current-supply to said windings, substantially as described.

15. The combination with a rotating central part or armature of a pair of field-magnets one mounted upon each side of said central part and adapted to coöperate therewith in the completion of the magnetic circuit to rotate the armature while in contact therewith or out of contact therewith, and means for moving said parts relatively to introduce or eliminate an air-space, substantially as described.

16. The combination with a central part or armature, of a pair of field-magnets upon opposite sides thereof, and means whereby one of said parts rotates the other with their opposed faces out of physical contact or with the face of one of said field-magnets in physical contact with the opposite face of said central part or armature, substantially as described.

17. The combination with a driving and a driven part, of a pair of field-magnets and the windings thereof associated with said driving and driven parts, means for accommodating the movement of said driving and driven parts relatively to introduce or eliminate an air-gap, and a controller for closing circuit through one of said windings in advance of the other and for opening circuit through said first-mentioned winding in advance of the other, substantially as described.

18. The combination with a driving and a driven part, of a pair of field-magnets and the windings thereof, said driving and driven parts being arranged to permit the introduction or elimination of an air-space between the opposed faces thereof, means for closing circuit through one of said windings in advance of the other, and for opening circuit through said first-mentioned winding in advance of the other, and means for varying the current through one or both of said windings, substantially as described.

19. The combination with the driving and driven parts, one comprising a pair of field-magnets, and the other an armature between said field-magnets, said parts being arranged to be moved laterally, a resistance in circuit with one of said windings and means for closing circuit through the winding which is in circuit with the resistance after circuit is closed through the other winding to thereby introduce an air-gap between the driving and driven parts, and means for opening the circuit through the winding which is not in circuit with the resistance in advance of the other winding to thereby eliminate the air-gap, substantially as described.

20. In combination a driving and a driven part carrying the coöperating members having their opposed faces transverse to their axes and movable toward and from each other axially, of a magnetic field arranged so that the said opposite faces thereof may rotate out of physical contact and with a thin film of air between the same of infinitesimal thickness, substantially as described.

21. In combination a driving and a driven part carrying the coöperating members having their opposed faces transverse to their axes and movable toward and from each other axially, of a magnetic field and having their opposed faces transverse to the axis of rotation and arranged to rotate out of physical contact and with an interposed film of air of infinitesimal thickness, substantially as described.

22. In combination, a driving and a driven part carrying the coöperating members of a continuously-active magnetic field, and having their opposed faces separated by a transverse air space or film, and means for rotating said parts with said air-film interposed or for rotating the same with the air-film eliminated and the opposed faces in physical contact, substantially as described.

23. The combination with a driving and a driven part carrying the coöperating members of a continuously-active magnetic field, of means for starting the same in rotation with an air space or film interposed between the opposed faces of said members, and means for moving said members to bring the opposed faces thereof into physical contact during the rotation to eliminate the said air-space, substantially as described.

24. The combination with a driving and a driven part carrying the coöperating members of a continuously-active magnetic field and having their opposed faces separated by a transverse air space or film, of means for starting said parts in rotation with said air space or film interposed between the opposed faces of said members, and for then during said rotation moving the said members to carry the opposed faces into physical contact, substantially as described.

25. The combination with a primary member having suitable energizing-windings, of a secondary member adapted to be inductively influenced thereby, and means whereby one of said members, the driven member, is driven by said primary member at less than full speed by induction alone and is driven by said primary member at full speed by friction alone.

In witness whereof I have hereunto subscribed my name in the presence of two witnesses.

HENRY H. CUTLER.

Witnesses:
M. R. ROCHFORD,
MELANCTHON R. NYMAN.